United States Patent Office 3,325,538
Patented June 13, 1967

3,325,538
PROCESS FOR THE THERMAL STEREOISOMERIZATION OF ALICYCLIC DICARBOXYLIC ACIDS
Peter William Foster, Fairfax, Wilmington, Del., assignor to E. I. du Pont de Nemours and Company, Wilmington, Del., a corporation of Delaware
No Drawing. Filed July 29, 1963, Ser. No. 298,399
6 Claims. (Cl. 260—514)

This invention pertains to the isomerization of alicyclic dicarboxylic acids containing two carboxycyclohexyl groups and a method for obtaining stereoisomers thereof in desired proportions.

Stereoisomeric mixtures of alicyclic dicarboxylic acids can be prepared readily by hydrogenation of an ester of the corresponding aromatic acid, using platinum or ruthenium catalysts, followed by hydrolysis of the alicyclic ester to form the acid. It is common knowledge that the acid so obtained, in each case, consists of a mixture of geometrical stereoisomers which differ only in regard to the cis and trans orientation of the acid groups on the alicyclic ring.

Since each ring can be substituted in a cis or trans configuration, bicyclic compounds can exist in three or more isomeric forms due to various combinations of cis and trans configurations on each ring. For example, 1,4-substituted compounds such as bis(4-carboxycyclohexyl) can exist in three forms, i.e., cis-cis, cis-trans or trans-trans configurations.

Usually it is more desirable to use a single acid isomer or an isomer ratio different from that obtained by the above preparation. This is particularly true when the acid is to be used in the preparation of high polymers such as polyamides and polyesters. The marked effect which the cis-trans isomer content of alicyclic polymer raw materials can have on polymer physical properties is described in U.S. 2,901,466 for polyesters containing cis and trans 1,4-cyclohexane dimethanol.

Normal purification procedures such as recrystallization from an inert solvent can be used to separate a preferred isomer from a mixture of isomers; however, this can result in poor yields of the desired isomer and an excess of the unwanted isomer which must then be discarded. This inefficiency can be avoided by subsequent isomerization of the undesired isomer to a mixture of isomers and the separation repeated.

The use of strong acidic or basic catalysts to bring about isomerization of alicyclic dicarboxylic acids is well-known (E. H. Rodd, "Chemistry of Carbon Compounds," vol. II, Part A, Alicyclic Compounds, Elsevier Publishing Company, New York, 1953, pp. 235–236). An equilibrium mixture of stereoisomers is obtained, the composition of which is controlled by the relative thermodynamic stabilities of the isomers involved under the reaction conditions employed. For 1,4-disubstituted cyclohexane compounds the trans stereoisomers are usually more thermodynamically stable than the cis-isomers. The reverse is true for 1,3-disubstituted cyclohexanes. Therefore, for bicyclic compounds containing two disubstituted cyclohexane rings, the greatest thermodynamic stability is normally realized when each ring is in its most stable configuration according to the foregoing rule, i.e., trans-trans for compounds such as bis(4-carboxycyclohexyl).

The present invention comprehends alicyclic dicarboxylic acids containing two carboxy-cyclohexyl groups, in a fused or linked configuration, any additional constituents of the acid being selected from the class consisting of ether oxygen and saturated hydrocarbon groups having a total of up to 8 carbon atoms and isomerization of the acids to a more thermodynamically stable mixture of stereoisomers by heating under an inert atmosphere.

This invention makes it possible for the less stable stereoisomers of dicarboxylic acids comprising the group consisting of 2,6-decahydronaphthalic acid and the acid described by the general formula:

$$HO_2C-Q-(R)_m-Q-CO_2H$$

wherein Q is a saturated divalent hydrocarbon radical from the group consisting of 1,3- and 1,4-cyclohexylene; $m$ is 0 or 1; and R is a saturated divalent hydrocarbon radical of 1–8 carbon atoms with a straight chain, branched chain or cyclic arrangement, preferably a chain of carbon atoms not more than four in length, to be isomerized to the more stable stereoisomers by heating under an inert atmosphere in the absence of conventional catalysts.

In addition, a stereoisomeric mixture of an acid from the group consisting of bis(4-carboxycyclohexyl), bis(4-carboxycyclohexyl) alkanes and 2,6-decahydronaphthalic acid containing less than the equilibrium amount of the most stable stereoisomer can be substantially enriched with the most stable isomer by heating under an inert atmosphere in the absence of conventional catalysts.

Another embodiment of this invention entails conversion of a stereoisomeric mixture of an acid from the groups consisting of bis(4-carboxycyclohexyl), 1,2-bis(4-carboxycyclohexyl) ethane, 1,3-bis(4-carboxycyclohexyl)cyclohexane and 2,6-decahydronaphthalic acid containing less than 70% of the all trans isomer to a mixture containing greater than 85% of the all trans isomer by heating under an inert atmosphere in the absence of conventional strongly acidic or basic catalysts.

The process of this invention can be carried out at a convenient rate with yields of the more stable stereoisomer frequently greater than those obtained by conventional means employing solvents and strong catalysts. Elimination of the latter avoids the usual need to separate the desired product therefrom. Furthermore, this invention can be used as a convenient route to specific stereoisomers of the corresponding glycols. These can be prepared from the parent acid stereoisomer by reduction of the acid ester with retention of the stereoisomeric configuration, processes for which are common knowledge to one skilled in the art. Thus, high yields of specific glycol as well as acid stereoisomers can be obtained.

The starting stereoisomeric acid can be obtained in any suitable way. Catalytic hydrogenation of an ester of the corresponding aromatic carboxylic acid, followed by hydrolysis, is a convenient route to the preparation of an isomeric mixture useful in this invention. It is to be understood also that the invention applies equally well to any of the less thermally stable individual isomers which can be separated from such a mixture.

The process is carried out at elevated temperatures. Temperatures on the order of 200–350° C. should be used with 250–300° C. being the preferred range. It is not necessary that the temperature remain constant during the reaction. Temperature can be raised during the heating cycle to increase the rate of isomerization as desired.

The process will be carried out under an inert atmosphere. Such an atmosphere may be obtained by the use of a high vacuum on an inert gas, such as nitrogen, at sub-, super-, or atmospheric pressure in an appropriate, closed vessel.

The process of this invention may be carried out for whatever time is necessary to reach the desired ratio of stereoisomers. Normally this will be the final equilibrium ratio at the reaction temperature. A reaction time of 1–24 hours is usually adequate with 2–4 hours being preferable. Longer times may be used without detriment but usually to little advantage.

This invention can be performed in a continuous or semi-continuous manner as well as by a batch operation. In addition, should separation of a single isomer from the resulting mixture be desired, the remaining isomers may be re-cycled through the process to improve the yield of the preferred material.

The usefulness of dicarboxylic acids of the type relating to this invention, as intermediates in the preparation of high polymers, is well known as described, for example, in U.S. 3,007,900. Such polymers are useful in the manufacture of synthetic fibers and films. The specific stereoisomer content of such acids is of particular importance in determining the properties of high polymers prepared from them. In addition, since the reaction rate of stereoisomers differ from one another, reproducibility of isomer content is of extreme importance in the process control of polymerization reactions involving mixed stereoisomers. Furthermore this applies equally well to the use of the stereoisomeric glycols which can be prepared by reduction of the corresponding acids with retention of the stereoisomeric configuration by well-known means.

The following illustrative examples are provided for a further understanding of this invention but are not intended to limit the scope thereof except as specified in the appended claims.

*Example I*

To a solution of 30 g. of dimethyl 4,4'-bibenzoate in 150 cc. of acetic acid is added 0.5 g. of finely-divided platinum oxide (Adams' catalyst), after which the mixture is hydrogenated on a Parr shaker for 6 hours at 45° C. under an atmosphere of 50 p.s.i. of hydrogen. The catalyst is then filtered off and the acetic acid is neutralized by adding aqueous sodium carbonate. The product is bis(4-carbomethoxycyclohexyl), a solid of low melting point.

Ninety g. of bis(4-carbomethoxycyclohexyl), prepared as described, is dissolved in 500 cc. of methanol and 200 cc. of water. To the solution is added 80 g. of sodium hydroxide, after which the solution is refluxed overnight. The reaction mixture is worked up by distilling off the methanol and acidifying the aqueous solution with concentrated hydrochloric acid. The solid so obtained, bis(4-carboxycyclohexyl) is washed and dried, the yield being 84 g. The acid melts over a wide range, 220–350° C.

The acid is isomerized by placing it in a container under vacuum of 15 mm. of mercury and heating it for one hour at 250° C., then for two hours at 300° C. The resulting product has a melting point of 355° C.

A solution of 84 g. of the isomerized acid in 800 cc. of methanol is refluxed overnight with 20 cc. of concentrated sulfuric acid and poured on ice, after which the product is filtered off and washed. After two recrystallizations from a mixture of 90 parts of methanol and 10 parts of water, the product melts at 116° C. Gas liquid chromatography of a sample (4 ft. column of high molecular weight polyethylene glycol wax at 250° C.) establishes that all of the material passes through in a single peak, indicating that the product is the pure geometrical isomer, trans,trans-dimethyl - bis(4 - carboxycyclohexyl) (ref.: Fichter and Holbro, Helv. Chim. Acta, 21, 141, 1938).

*Example II*

Bis(4-carbomethoxycyclohexyl) obtained by a high pressure hydrogenation procedure is subjected to gas liquid chromatography. Three peaks are observed, amounting to 60%, 35%, and 5% of the product, respectively. When pure trans-trans bis(4-carbomethoxycyclohexyl), prepared as described in Example I is added to the sample and another gas liquid chromatography determination is made, the third peak is enhanced. A sample of the ester product is then heated for twenty-four hours with sodium methoxide in refluxing methanol. Gas liquid chromatography of the resulting ester indicates that the isomer composition has been greatly changed; the first, second, and third peaks amounting to 5%, 35%, and 60%, respectively. Based on this data, the order of appearance of the peaks corresponds to the cis-cis, cis-trans, and trans-trans isomers respectively.

*Example III*

Bis(4-carboxycyclohexyl) was prepared from bibenzoic acid by hydrogenation over ruthenium dioxide catalyst in aqueous potassium hydroxide at 1000 p.s.i. and 80–100° C. The isomer composition as determined by vapor phase chromatography of the dimethyl ester was 48% cis-cis, 44% cis-trans and 8% trans-trans. Heating this material in a sealed tube under vacuum for one hour at 250° C. and two hours at 300° C. gave the acid whose isomer composition was 90% trans-trans and 10% cis-trans.

The pure trans-trans isomer was obtained by recrystallization of the mixture from acetic acid. The cis-trans isomer concentrated in the mother liquid could be largely converted to trans-trans by recycling through the above isomerization procedure.

*Example IV*

An isomeric mixture of the dimethyl ester of bis(4-carboxycyclohexyl) was analyzed by vapor phase chromatography and found to contain the following isomers: 56% cis-cis, 38% cis-trans, and 6% trans-trans. Isomerization of this ester by refluxing with sodium methoxide in methanol resulted in an isomeric mixture containing 5% cis-cis, 35% cis-trans and 60% trans-trans.

*Example V*

Bis(4-carboxycyclohexyl), 5 grams, was sealed in a polymer tube, after flushing with nitrogen, with 10 ml. of concentrated hydrochloric acid. The tube was heated to 180° C. for 3 hours, allowed to cool and opened. The bis(4-carboxycyclohexyl) acid had turned grey. The acid was filtered, washed well with water and dried at 100° C. for 48 hours. After drying the acid was white. The dried acid had a melting range of 233–355° C. The untreated control acid had a melting range of 224–330° C.; whereas the acid heated as per Example I had a melting point of 355° C.

*Example VI*

Forty-nine grams of the dimethyl ester of trans-trans bis(4-carboxycyclohexyl) were treated with 16 grams of lithium aluminum hydride in one pound of anhydrous ether. The reaction mixture was heated on a steam bath and 200 ml. of tetrahydrofuran were added to dissolve material which had crystallized out from the reaction. The mixture was heated at reflux for five hours with stirring then overnight at reflux with no stirring. Ethyl acetate, 100 ml., was added dropwise followed by 25 ml. of acetone to destroy residual lithium aluminum hydride. The mixture was acidified with 75 ml. of concentrated sulfuric acid diluted with ice water. The ether was evaporated and water added. The mixture was filtered leaving an orange filtrate. The color was discharged upon the addition of sodium acetate. The glycol was recrystallized from ethyl alcohol and water providing an 88% yield of the trans-trans glycol isomer melting at 164–167° C.

*Example VII*

The dimethyl ester of 1,2-bis(4-carboxycyclohexyl) ethane was prepared by hydrogenation of the corresponding aromatic acid using platinum oxide catalyst. The recrystallized ester product was found to consist of 82% cis-cis, 3% cis-trans, and 15% trans-trans isomers. The isomeric mixture was saponified with potassium hydroxide to yield the corresponding acid of the same stereoisomeric composition, a well-known process. The acid was isomerized by heating in a tube one hour at 250° C. and two hours at 300° C. under 15 mm. of nitrogen pressure to yield a product containing approximately 90% of the trans-trans acid isomer.

Example VIII

Bis(4-carboxycyclohexyl) having a melting point of 217–351° C. was heated in a tube at 250° C. for 22 hours. The resulting product had a melting point range of 344–353° C.

Example IX

An isomeric mixture of 2,2-bis(4-carboxycyclohexyl) propane [less than 20% in trans-trans content] was heated in a tube at 250° C.–300° C. for three hours. The isomerized product contained 55% of the trans-trans isomer.

Example X

An isomeric mixture [less than 20% in trans-trans content] of bis(4-carboxycyclohexyl) methane was isomerized by heating one hour at 250° C. and two hours at 300° C. under 15 ml. of nitrogen pressure. The resulting acid was esterified with methanol and the dimethyl ester analyzed by vapor phase chromatography for isomer content. The product contained 9% of the cis-cis, 35% cis-trans and 56% of the trans-trans isomers.

Example XI 1,1,2,2-tetramethyl-1,2-bis(4-carboxylcyclohexyl) ethane was prepared by hydrogenation of bicumic acid. Vapor phase chromatographic analysis of the dimethyl ester of the resulting acid mixture showed an isomer content of 33% cis-cis, 49% cis-trans and 18% trans-trans. The acid was isomerized by heating under vacuum for 2 hours at 250° C. and one hour at 300° C. in a tube. The isomerized mixture contained 10% cis-cis, 41% cis-trans and 49% of the trans-trans isomer.

Example XII 1,3-bis(4-carboxycyclohexyl) cyclohexane [less than 20% in trans-trans content] was isomerized by heating 2 hours at 250° C. and one hour at 300° C. under 15–20 mm. of nitrogen pressure. Vapor phase chromatography of the dimethyl ester showed the isomerized product to be at least 80% of the trans-trans isomer.

Example XIII 26 grams of 2,6-decahydronaphthalic acid were heated under nitrogen at reduced pressure (approximately 15 mm. Hg) for one hour at 200° then at 250–275° for 2–3 hours. The resulting acid was esterified with diazomethane. Analysis of the ester showed the isomer content to be 90% trans and 10% cis for the diester. The starting acid had originally contained 55% trans and 45% cis isomers.

Example XIV

Isomerization of 2,6-decahydronaphthalic acid, melting point 210–220° C. (from saponification of a 60/40 trans-cis dimethyl-2,6-decahydronaphthalic acid) at 250–300° C. for 3 hours followed by esterification and recrystallization gave a mixture containing 99% of the trans diester. The isomerized acid had a melting point greater than 300° C.

It is to be understood that this invention can be applied to other poly-alicyclic carboxylic acid ring structures containing fused and linked rings such as as well as those which have been described. It is recognized that a catalyst could be used during the isomerization if desired.

These and other modifications will be apparent to those skilled in the art from a reading of the above without a departure from the inventive concept.

What is claimed is:

1. A process which comprises heating for at least about one hour under an inert atmosphere and in the absence of a catalyst stereoisomers of a dicarboxylic acid from the class consisting of 2,6-decahydronaphthalic acid and the acid described by the general formula:

$$HO_2C—Q—(R)_m—Q—CO_2H$$

wherein Q is a saturated divalent hydrocarbon radical from the group consisting of 1,3- and 1,4-cyclohexylene; $m$ is 0 or 1; and R is a saturated divalent hydrocarbon radical of 1–8 carbon atoms forming a more thermodynamically stable mixture of stereoisomers by stereoisomerization.

2. The process of claim 1 wherein the said dicarboxylic acid is bis(4-carboxycyclohexyl).

3. The process of claim 1 wherein the said dicarboxylic acid is 1,2-bis(4-carboxycyclohexyl) ethane.

4. The process of claim 1 wherein the said dicarboxylic acid is 1,3-bis(4-carboxyclcohexyl)cyclohexane.

5. The process of claim 1 wherein the said dicarboxylic acid is 2,6-decahydronaphthalic acid.

6. The process of claim 1 wherein the said acid is heated between a temperature from about 200° C. to about 350° C.

References Cited

UNITED STATES PATENTS 3,133,973   5/1964   Smith et al. _____ 260—468 X

OTHER REFERENCES

Stewart: "Sterochemistry," 2nd ed. (1919), pp. 107–108.

LORRAINE A. WEINBERGER, *Primary Examiner.*

R. K. JACKSON, *Assistant Examiner.*